Nov. 16, 1948.  S. B. SWEETSER  2,453,874
HYDROCARBON SYNTHESIS
Filed Feb. 1, 1946
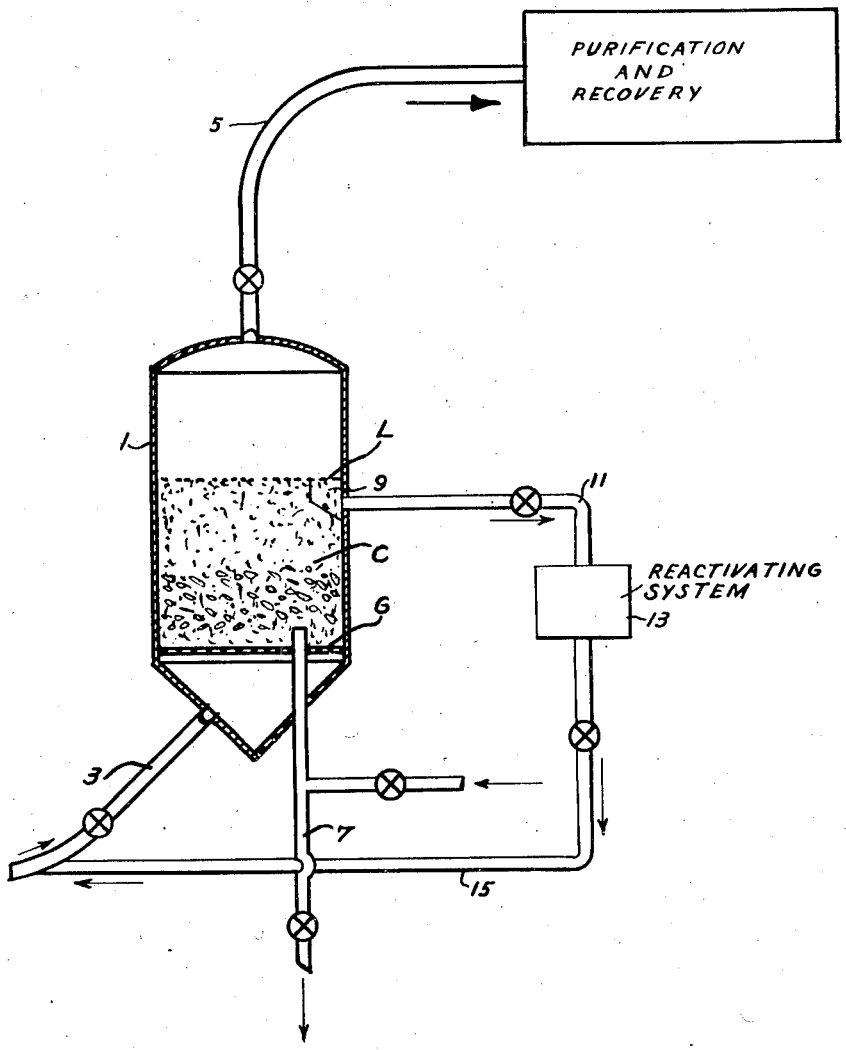
Sumner B. Sweetser Inventor
By P. J. Whelan Attorney Patented Nov. 16, 1948

2,453,874

UNITED STATES PATENT OFFICE 2,453,874

HYDROCARBON SYNTHESIS

Sumner B. Sweetser, Baton Rouge, La., assignor to Standard Oil Development Company, a corporation of Delaware Application February 1, 1946, Serial No. 644,957

9 Claims. (Cl. 260—449.6)

1

The novel features of my invention are fully disclosed in the following specification and claims read in connection with the accompanying drawing, which forms a part of the specification.

The synthesis of hydrocarbons for carbon monoxide and hydrogen is a matter of record. Heretofore hydrocarbons boiling within the gasoline and gas oil range have been synthesized by causing a mixture of carbon monoxide and hydrogen to react at elevated temperatures in the presence of a suitable catalyst, which catalyst may be a metal selected from group VIII of the periodic system. The catalysts heretofore most commonly used have been either metallic cobalt or iron. Also in the prior practice the ratio of carbon monoxide to hydrogen employed in the feed gas to the reaction zone has varied from about 2 mols of hydrogen per mol of carbon monoxide to 1 mol of hydrogen per mol of carbon monoxide. In general with cobalt catalyst a synthesis gas containing a 2 to 1 ratio of hydrogen to carbon monoxide has been used whereas with iron catalyst a feed gas containing the hydrogen and carbon monoxide in approximately equal proportions has in the past generally been considered preferable. The product obtained from the iron catalyst is generally more unsaturated than that obtained with cobalt catalyst and is therefore more desirable for use in gasoline because of its superior anti-knock qualities. However, the product obtained from the iron catalyst also contains an appreciable proportion of oxygenated compounds which are undesirable when the product is to be used in gasoline. My improvements go to the concept of reducing the oxygen content of hydrocarbons produced synthetically from carbon monoxide and hydrogen where the catalyst employed is iron.

The object of my invention is to produce hydrocarbons by reacting carbon monoxide and hydrogen under conditions such that the liquid product is of improved octane number and substantially free of oxygenated compounds.

In the accompanying drawing I have shown diagrammatically a few essentials of the apparatus layout in which a preferred modification of my invention will be carried into effect.

To the accomplishment of the foregoing and related ends, I provide in the reaction zone and mixed with the hydrocarbon synthesis catalyst, a quantity of dehydration catalyst, and I have found that the oxygenated compounds which are formed are substantially eliminated from the product. I am fully aware that prior to my invention others have utilized dehydrating components in the preparation of catalysts for the synthesis of hydrocarbons. However, introduction of these dehydrating materials by the usual methods has in many cases had an adverse effect on the activity of the catalyst and has not given effective elimination of the oxygenated compounds. These dehydrating constituents have generally been introduced into the catalyst by coprecipitation or by impregnation, as by impregnating an iron salt on a form of alumina such as activated alumina or alumina gel. These methods of preparation of the catalyst make the alumina an integral part of the catalyst and often modify the activity of the primary constituents such as the iron to a considerable extent. According to my present improvements, the dehydrating constituent is mixed with the finished synthesis catalyst mechanically so that the synthesis catalyst as well as the dehydrating constituent retains its complete identity and one in nowise affects the properties of the other. While such a mixture can be employed in a fixed bed, I prefer to use a mixture of finely divided powder in a fluid type of operation. This gives much more intimate mixing of the separate particles than can be obtained in fixed bed operation while the two components of the mixture still retain their complete identity.

Referring in detail to the drawing, I represents a reaction vessel in which the synthesis of hydrocarbons from carbon monoxide and hydrogen is performed. A catalyst C comprising finely divided iron having an average particle size from 5 to 300 microns is disposed in the reaction vessel I in the form of a dense turbulent suspension. This suspension is formed by causing the synthesis gas, that is to say, a mixture of carbon monoxide and hydrogen in the ratio of about one to one to enter the system through line 3, and then to pass upwardly through a grid G into the main body of the reactor, where it flows at a rate of from 0.25 to 2 or more feet per second, thus permitting delayed settlement and the formation of the said dense turbulent suspension previously referred to, which may have a density of from about 50 to 150 pounds per cu. ft. Depending on the actual weight of catalyst disposed in the reactor as well as on the particle size of the catalyst and the superficial velocity of gases and vapor maintained in the reactor, the dense phase will have an upper level at some point L above which there will be a more dilute phase. These phenomena are typical of the fluid catalyst type of operation and need not be explained in any great detail, since the art has become generally familiar with this type of operation, at least in its broad aspects. The reactants remain resident in the reaction zone at the proper temperature, say around 600° F., and super atmospheric pressure for sufficient time to effect the desired conversion, whereupon a crude product is withdrawn overhead from line 5 and delivered for recovery and purification in conventional equipment not shown. The reactor 1 is usually provided with a withdrawal pipe 7 through which catalyst may be withdrawn from the reactor at least periodically for at least one purpose or another, such as to regenerate the catalyst, to cool it, or for some other purpose. These features of the typical operation need not be described herein since they are known to those familiar with the art. It should also be mentioned that in the conventional hydrocarbon synthesis unit the reactor is provided in its upper portion with solids-gas separating devices through which the effluent gases are forced for the purpose of removing entrained solids.

As I previously pointed out, the hydrocarbon synthesis results in the formation of oxygenated compounds and it is an essential feature of my invention that I include in mechanical mixture with the active catalyst a portion of a dehydration catalyst, such as aluminum oxide. In a preferred modification of my invention I admix aluminum oxide with the catalyst, the aluminum oxide having a smaller particle size than that of the active catalyst. For example, the iron catalyst may be used in a particle size of 50 to 300 microns whereas the dehydrating catalyst added may have a particle size of from 1 to 50 microns. Because of this difference in particle size as well as the difference in the density between alumina, which is the preferred dehydrating material, and the iron catalyst, there will be at least a rough classification of the powdered materials in the reactor with the iron catalyst having a higher concentration in the bottom of the reactor and the alumina having a higher concentration in the upper part of the reactor. This classification is particularly desirable since oxygenated compounds which may be formed by the iron catalyst in the bottom part of the reactor are dehydrated by contact with the alumina dehydrating catalyst in the top part of the reactor. Furthermore, it results in a lower concentration of water vapor in the bottom part of the reactor than would be the case if the dehydrating action occurred uniformly throughout the length of the reactor. It is desirable to maintain the concentration of water vapor in the bottom of the reactor at a minimum in order to inhibit so far as possible the water gas shift reaction whereby carbon monoxide in the feed is converted to carbon dioxide.

The following example will illustrate the improvements which may be obtained by mixing a dehydrating agent, such as alumina, with an active iron catalyst for the synthesis of hydrocarbons. A catalyst consisting of 10% potassium carbonate impregnated on red-iron oxide after reduction with hydrogen was treated with synthesis gas containing equal volumes of carbon monoxide and hydrogen at a temperature of 315° C. and a pressure of 250 pounds per square inch at a feed rate of 200 volumes of synthesis gas per hour per volume of catalyst. Under these conditions, a yield of approximately 135 cc. of liquid product was obtained in the hydrocarbon layer for each cubic meter of hydrogen and carbon monoxide fed to the reactor. The ratio of the hydrocarbon layer to the aqueous layer obtained in the product was 2.8 to 1. When the product in the hydrocarbon layer was analyzed for oxygen, it was found to contain 2.20%. The aqueous layer was analyzed for carbon and found to contain 4.7%. In another experiment the same catalyst was diluted with an equal volume of activated alumina and operated under essentially the same conditions. Approximately the same yield of product in the hydrocarbon layer was obtained. However, in this case the ratio of the hydrocarbon layer to the aqueous layer was 2.0, and by analysis, the hydrocarbon layer was found to contain only 0.84% oxygen and the aqueous layer to contain only 2.3% carbon. It is obvious from these experiments that a product with a considerably smaller concentration of oxygenated materials was obtained by diluting the iron catalyst with the dehydrating agent.

To recapitulate briefly, in the synthesis of hydrocarbons from carbon monoxide and hydrogen in the presence of a catalyst appreciable amounts of oxygenated compounds are produced along with the desired hydrocarbons. The proportion of oxygenated products is generally a large part of the total when using iron catalysts. This represents a serious loss in yield of the desired product and introduces a serious problem in converting those compounds to materials which are suitable for use in motor fuel.

According to the present invention the production of oxygenated products is reduced to a level which can be tolerated in motor fuels. This result is effected by mixing a finely divided dehydrating catalyst with the synthesis catalyst in the reaction zone. Under the conditions existing in the reactor the dehydrating catalyst will cause water to be split out of such oxygenated compounds as alcohols, aldehydes, ketones, etc., giving olefins which are desirable constituents of the finished product. Suitable catalysts for the dehydration are activated alumina, alumina gel, silica gel, thorium oxide, aluminum phosphate, magnesium phosphate and calcium sulfate.

The ratio of dehydrating catalyst to synthesis catalyst in the reactor may be from about 0.1 to 2.0 on a volume basis. Ordinarily, the dehydrating catalyst will require no other reactivating treatment than that given the synthesis catalyst. However, in cases where more frequent reactivation of the dehydrating catalyst is necessary, by virtue of my improvements whereby the dehydrating catalyst is employed in finer particle size than the hydrocarbon synthesis catalyst, the dehydrating catalyst may be withdrawn through overflow 9 and line 11 from the top of the reactor diluted with only small amounts of catalyst and therefore can be reactivated in a suitable reactivating system 13 separately from the catalyst by known means and returned through lines 15 and 3 to the reactor. Likewise, it is possible to withdraw catalyst diluted with only relatively small amounts of dehydrating agent from the bottom of the reactor for separate treatment, such as reactivation, if so desired.

While this invention may be applied with any of the known types of synthesis catalysts, it finds its greatest use with iron catalysts which generally produce a high concentration of oxygenated compounds in the liquid product.

What I claim is:

1. The method of forming normally liquid hydrocarbons, which comprises forcing a mixture of carbon monoxide and hydrogen upwardly through a dense suspension of powdered synthesis catalyst and a quantity of powdered dehydration catalyst, fluidized by the upwardly flowing gases, concentrating said dehydration catalyst in the upper portion of said suspension, permitting the carbon monoxide and hydrogen to contact both catalysts at synthesis temperatures and pressures and for a period of time adapted to effect the formation of major proportions of normally liquid hydrocarbons and minor proportions of oxygenated compounds on said synthesis catalyst, and recovering from said dehydration catalyst a normally liquid total product of relatively low oxygen content.

2. The method set forth in claim 1 in which the dehydration catalyst is powdered alumina.

3. The method set forth in claim 1 in which the average particle size of synthesis catalyst is substantially greater than that of the dehydration catalyst.

4. The method set forth in claim 1 in which the ratio of carbon monoxide to hydrogen in the feed is substantially 1 to 1.

5. The method of synthesizing normally liquid hydrocarbons, including hydrocarbons boiling within the gasoline boiling range, which comprises forcing a mixture of carbon monoxide and hydrogen upwardly in contact with a dense suspension of powdered iron catalyst and a quantity of powdered dehydration catalyst, fluidized by the upwardly flowing gases, through a reaction zone maintained at hydrocarbon synthesis temperatures and pressures, concentrating said dehydration catalyst in the upper portion of said reaction zone, permitting the carbon monoxide and hydrogen to remain in contact with the iron catalyst and the powdered dehydration catalyst for a sufficient period of time to effect the formation of major proportions of normally liquid hydrocarbons and minor proportions of oxygenated compounds on said iron catalyst, and recovering from said dehydration catalyst a normally liquid total product of relatively low oxygen content.

6. The method set forth in claim 5 in which the dehydration catalyst is powdered alumina.

7. The method set forth in claim 5 in which the average particle size of synthesis catalyst is substantially greater than that of the dehydration catalyst.

8. The method set forth in claim 5 in which the ratio of carbon monoxide to hydrogen in the feed is substantially 1 to 1.

9. The method of claim 7 in which said dehydration catalyst is withdrawn from said reaction zone separate from said iron catalyst, regenerated and returned to said reaction zone.

SUMNER B. SWEETSER.

REFERENCES CITED

The following references are of record in the file of this patent:

UNITED STATES PATENTS

| Number | Name | Date |
|---|---|---|
| 1,741,306 | Jaeger | Dec. 31, 1929 |
| 2,257,293 | Dreyfus | Sept. 30, 1941 |
| 2,264,427 | Asbury | Dec. 2, 1941 |
| 2,347,682 | Gunness | May 2, 1944 |
| 2,393,909 | Johnson | Jan. 29, 1946 |
| 2,406,864 | Thomas | Sept. 3, 1946 |

FOREIGN PATENTS

| Number | Country | Date |
|---|---|---|
| 278,353 | Great Britain | Mar. 25, 1929 |